(12) United States Patent
Nishimura et al.

(10) Patent No.: US 11,929,599 B2
(45) Date of Patent: Mar. 12, 2024

(54) WIRING MEMBER WITH FIXING MEMBER AND MANUFACTURING METHOD OF WIRING MEMBER WITH FIXING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Daisuke Ebata, Mie (JP); Taku Umehara, Mie (JP); Ryuta Takakura, Mie (JP); Kenta Arai, Mie (JP); Miyu Aramaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 203 days.

(21) Appl. No.: 17/432,805

(22) PCT Filed: Mar. 6, 2019

(86) PCT No.: PCT/JP2019/008754
§ 371 (c)(1),
(2) Date: Aug. 20, 2021

(87) PCT Pub. No.: WO2020/178997
PCT Pub. Date: Sep. 10, 2020

(65) Prior Publication Data
US 2022/0123536 A1    Apr. 21, 2022

(51) Int. Cl.
*H02G 3/00* (2006.01)
*H02G 3/04* (2006.01)

(52) U.S. Cl.
CPC .................. *H02G 3/0456* (2013.01)

(58) Field of Classification Search
CPC .................................................. H02G 3/0456
See application file for complete search history.

(56) References Cited

U.S. PATENT DOCUMENTS

| 10,867,721 B2 | 12/2020 | Ishida et al. |
| 2014/0054085 A1 | 2/2014 | Vermeulen et al. |
| 2014/0239131 A1* | 8/2014 | Sylvester ................. H02G 3/32 248/68.1 |
| 2015/0000974 A1 | 1/2015 | Shiga et al. |

(Continued)

FOREIGN PATENT DOCUMENTS

| CN | 103635977 | 3/2014 |
| CN | 104520150 | 4/2015 |
| CN | 104737398 | 6/2015 |
| CN | 109075546 | 12/2018 |

(Continued)

OTHER PUBLICATIONS

JP 7-220528 English Translation (Year: 1993).*
(Continued)

*Primary Examiner* — Pete T Lee
(74) *Attorney, Agent, or Firm* — Greenblum & Bernstein, P.L.C.

(57) ABSTRACT

A wiring member with a fixing member includes a wiring member, and a fixing member. The wiring member includes a plurality of wire-like transmission members and a base material. The plurality of wire-like transmission members are fixed to the base material in an arrayed state. The base material is bent so as to surround the plurality of wire-like transmission members. The fixing member includes an attachment part and a fixing part. The attachment part is attached to the wiring member so as to be located on outside of the base material. The fixing part is a part being connected to the attachment part and being fixed to a fixing target of the wiring member. In a state in which the attachment part is attached to the wiring member, the base material is maintained in a bent state.

5 Claims, 5 Drawing Sheets

(56) References Cited

U.S. PATENT DOCUMENTS

| | | | |
|---|---|---|---|
| 2015/0214703 A1* | 7/2015 | Larsen | H02G 3/045 |
| | | | 174/97 |
| 2015/0275578 A1* | 10/2015 | Sylvester | H02G 3/263 |
| | | | 248/68.1 |
| 2015/0294768 A1 | 10/2015 | Sakaki et al. | |
| 2019/0139675 A1 | 5/2019 | Mizuno et al. | |

FOREIGN PATENT DOCUMENTS

| | | |
|---|---|---|
| JP | 07-220528 | 8/1995 |
| JP | 7-320544 | 12/1995 |
| JP | 9-97520 | 4/1997 |
| JP | 2000-165061 | 6/2000 |
| JP | 2010-282773 | 12/2010 |
| JP | 2011-149456 | 8/2011 |
| JP | 2012-99367 | 5/2012 |
| JP | 2014-517446 | 7/2014 |
| JP | 2014-204485 | 10/2014 |
| JP | 2015-053804 | 3/2015 |
| JP | 2015-097438 | 5/2015 |
| JP | 2018-137208 | 8/2018 |

OTHER PUBLICATIONS

JP2012099367 English Translation (Year: 2012).*
WO-2016121479-A1 English Translation (Year: 2016).*

Office Action issued in Corresponding CN Patent Application No. 201980093478.4, dated Jul. 28, 2022, along with an English translation thereof.
Office Action issued in Corresponding CN Patent Application No. 202080017607.4, dated Jul. 5, 2022, along with an English translation thereof.
Office Action issued in Corresponding JP Patent Application No. 2019-103201, dated Oct. 18, 2022, along with an English translation thereof.
Office Action issued in Corresponding JP Patent Application No. 2020-072866, dated Dec. 13, 2022, along with an English translation thereof.
International Search Rep issued in International Pat. Appl. No. PCT/JP2019/008754, dated May 21, 2019, along with an English translation thereof.
International Search Rep issued in corresponding International Pat. Appl. No. PCT/JP2020/001852, dated Apr. 14, 2020, along with an English translation thereof.
International Preliminary Report on Patentability issued in International Pat. Appl. No. PCT/JP2019/008754, dated Sep. 16, 2021, along with an English Translation thereof.
International Preliminary Report on Patentability issued in International Pat. Appl. No. PCT/JP2020/001852, dated Sep. 16, 2021, along with an English Translation thereof.
Co-pending U.S. Appl. No. 17/434,223 to Nishimura et al., dated Aug. 26, 2021.

* cited by examiner

WIRING MEMBER WITH FIXING MEMBER AND MANUFACTURING METHOD OF WIRING MEMBER WITH FIXING MEMBER

TECHNICAL FIELD

The present disclosure relates to a wiring member with a fixing member, and a manufacturing method of the wiring member with a fixing member.

BACKGROUND ART

Patent Document 1 discloses a wire harness. The wire harness includes a functional exterior member formed into a sheet-like shape, and an electric wire disposed to overlap the functional exterior member in at least a part of a region along a longitudinal direction. At least a portion of a part in which an insulation covering of the electric wire and the functional exterior member overlap is welded.

PRIOR ART DOCUMENTS

Patent Documents

Patent Document 1: Japanese Patent Application Laid-Open No. 2018-137208
Patent Document 2: Japanese Patent Application Laid-Open No. 2011-149456

SUMMARY

Problem to be Solved by the Invention

In the wire harness described in Patent Document 1, it is desirable to protect the entire circumference of the electric wire.

In view of this, the object is to provide a technology capable of protecting the entire circumference of a wire-like transmission member in a wiring member.

Means to Solve the Problem

A wiring member with a fixing member according to the present disclosure is a wiring member with a fixing member that includes a wiring member, and a fixing member. The wiring member includes a plurality of wire-like transmission members and a base material. The plurality of wire-like transmission members are fixed to the base material in an arrayed state. The base material is bent so as to surround the plurality of wire-like transmission members. The fixing member includes an attachment part and a fixing part. The attachment part is attached to the wiring member so as to be located on outside of the base material. The fixing part is a part being connected to the attachment part and being fixed to a fixing target of the wiring member. In a state in which the attachment part is attached to the wiring member, the base material is maintained in a bent state.

Effects of the Invention

According to the present disclosure, the entire circumference of the wire-like transmission member can be protected in the wiring member.

DESCRIPTION OF EMBODIMENTS

Description of Embodiments of Present Disclosure

Figure 1:
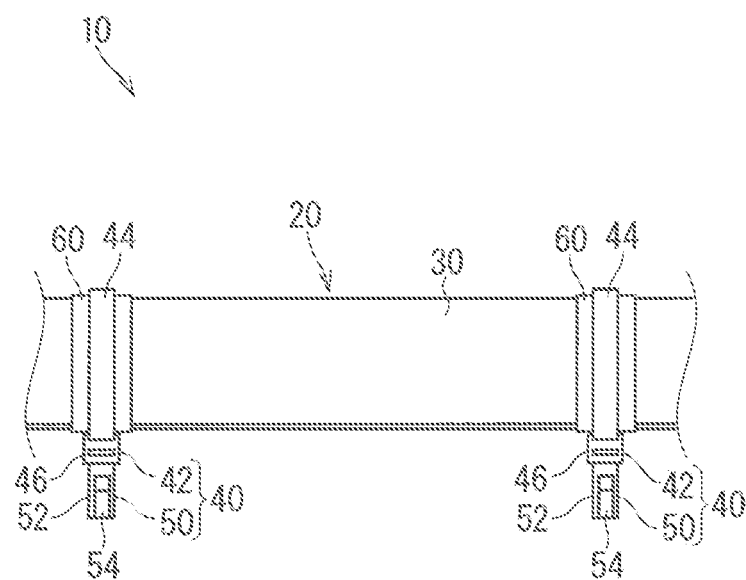
FIG. 1 is a side view illustrating a wiring member with a fixing member according to the first embodiment.

First, embodiments of the present disclosure will be listed below.

A wiring member with a fixing member according to the present disclosure is as follows.

(1) A wiring member with a fixing member includes a wiring member, and a fixing member. The wiring member includes a plurality of wire-like transmission members and a base material. The plurality of wire-like transmission members are fixed to the base material in an arrayed state. The base material is bent so as to surround the plurality of wire-like transmission members. The fixing member includes an attachment part and a fixing part. The attachment part is attached to the wiring member so as to be located on outside of the base material. The fixing part is a part being connected to the attachment part and being fixed to a fixing target of the wiring member. In a state in which the attachment part is attached to the wiring member, the base material is maintained in a bent state.

In a state in which the attachment part is attached to the wiring member in the wiring member, the base material is maintained in the bent state so as to surround the wire-like transmission member. Thus, in the wiring member, the entire circumference of the wire-like transmission member can be protected by the base material.

Here, the wire-like transmission member is a wire-like member that transmits electrical power, light, or the like.

(2) In the wiring member, cross-section may be in a spirally wound state. In this case, the base material can easily form the bent state so as to surround the wire-like transmission member.

(3) The fixing member may be a molded item obtained by integrally molding the attachment part and the fixing part. The attachment part may include an annular part being capable of changing a state between an annular state and a non-annular state and surrounding the wiring member in the annular state, and an annular shape maintaining part being provided at one end portion of the annular part and stopping another end portion of the annular part to maintain the annular part in the annular state. In this case, as the fixing member, a general-purpose band clamp, a corrugated clamp, or the like can be used.

(4) An intermediation member being fixed at an outer circumferential portion of the base material and being interposed between the annular part and the base material may be further included. A coefficient of friction in an outer surface of the intermediation member with respect to the annular part may be higher than a coefficient of friction in an outer surface of the base material with respect to the annular part. In this case, the annular part can reduce rotation of the wiring member in the circumferential direction.

(5) The fixing member may be a molded item obtained by integrally molding the attachment part and the fixing part. The attachment part may be formed into a plate-like shape extending in a longitudinal direction of the wiring member. The wiring member with the fixing member may further include a bundling member configured to bundle the attachment part and the wiring member. In this case, as the fixing member, a general-purpose taping-type clamp or the like can be used.

(6) The base material may include a body part in which the wire-like transmission member is disposed, and an extension piece in which the wire-like transmission member is not disposed, the extension piece extending from the body part. In the wiring member, the extension piece may be wound around once or more on an outer side of the body part. In this case, the entire outer side of the body part can be covered by the extension piece.

(7) Further, a manufacturing method of a wiring member with a fixing member according to the present disclosure is a manufacturing method of a wiring member with a fixing member, including the steps of: preparing a wiring member formed flat, the wiring member including a plurality of wire-like transmission members, and a base material in which the plurality of wire-like transmission members are fixed in an arrayed state; bending the base material so that the base material surrounds the plurality of wire-like transmission members; and attaching an attachment part in a fixing member to the wiring member so as to be located on outside of the base material so as to maintain Ute base material in a bent state, the fixing member including the attachment part, and a fixing part being connected to the attachment part and being fixed to a fixing target of the wiring member. In a state in which the attachment part is attached to the wiring member in the wiring member, the base material is maintained in the bent state so as to surround the wire-like transmission member. Thus, in the wiring member, the entire circumference of the wire-like transmission member can be protected by the base material.

Details of Embodiments of Present Disclosure

Specific examples of a wiring member with a fixing member according to the present disclosure will be described below with reference to the drawings. Note that the present invention is not limited to these examples but is recited in the claims, and encompasses meanings equivalent to those of the claims and all modifications within the scope of the claims.

First Embodiment

Figure 2:
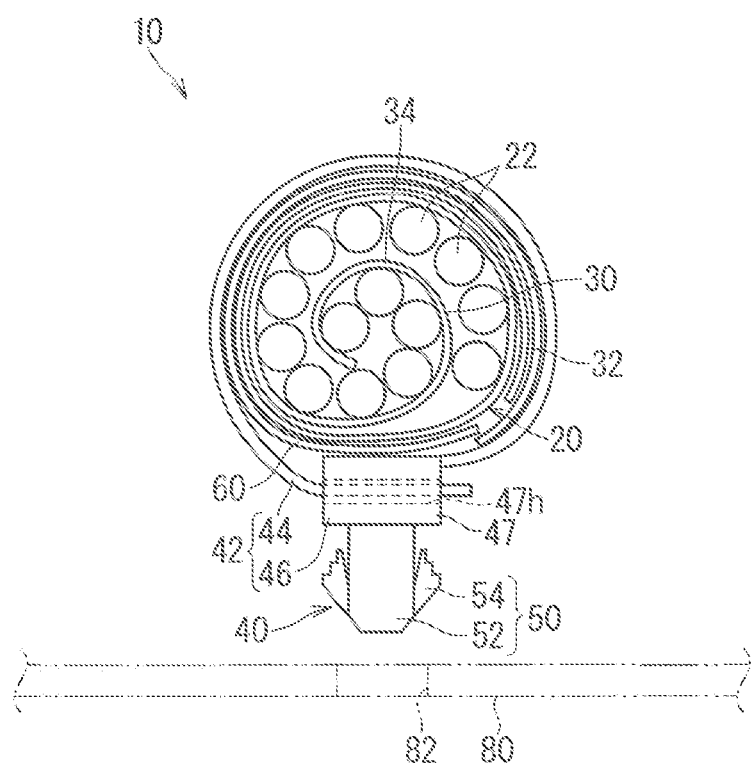
FIG. 2 is a front view illustrating the wiring member with a fixing member according to the first embodiment.
Figure 3:
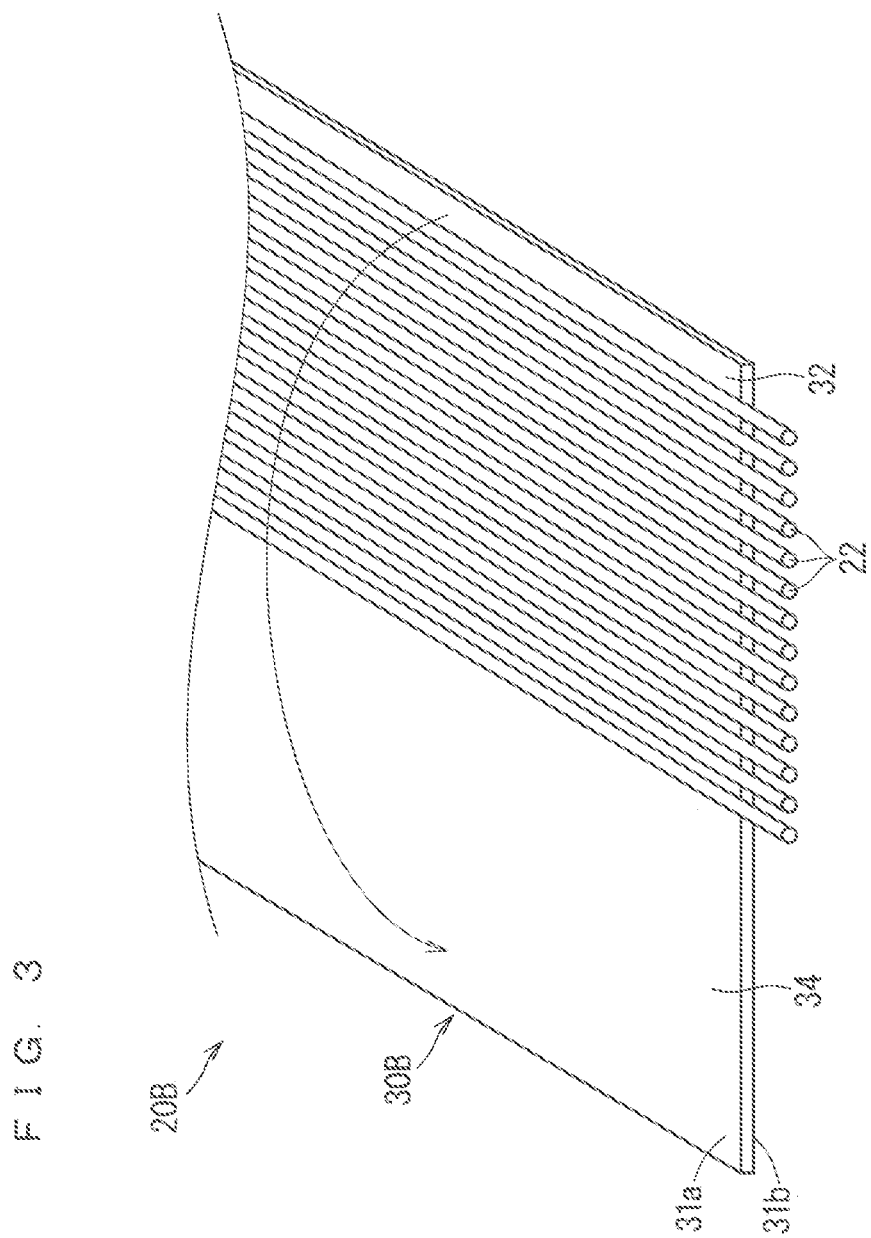
FIG. 3 is a perspective view illustrating a wiring member before a base material is bent.

A wiring member with a fixing member according to the first embodiment will be described below. FIG. 1 is a side view illustrating a wiring member with a fixing member 10 according to the first embodiment. FIG. 2 is a front view illustrating the wiring member with a fixing member 10 according to the first embodiment. FIG. 3 is a perspective view illustrating a wiring member 20 before a base material 30 is bent.

The wiring member with a fixing member 10 includes a wiring member 20 and a fixing member 40. The wiring member with a fixing member 10 according to the present example further includes an intermediation member 60.

The wiring member 20 is a member that is mounted on a vehicle, and that supplies electrical power to each device of the vehicle and transmits and receives signals. The wiring member 20 includes a plurality of wire-like transmission members 22, and a base material 30 that is fixed in a state in which the plurality of wire-like transmission members 22 are arrayed. In the wiring member 20, the base material 30 is bent so as to surround the wire-like transmission members 22. As illustrated in FIG. 3, the wiring member 20 is formed as follows: the wiring member 20 is once formed into a flat shape, and then the base material 30 is bent. In the following, the wiring member 20 before the base material 30 is bent is referred to as a flat wiring member 20B. The flat wiring member 20B has its dimension in the thickness direction being formed smaller than the dimension in a surface direction perpendicular lo the thickness direction. Here, the flat wiring member 20B is formed with the plurality of wire-like transmission members 22 being fixed on the base material 30.

It is only necessary that the wire-like transmission member 22 is a wire-like member that transmits electrical power or light. For example, the wire-like transmission member 22 may be a general wire having a core wire and a covering around the core wire, or may also be a bare conductive wire, a shielded wire, an enamel wire, a nichrome wire, or an optical fiber.

The wire-like transmission member 22 transmitting the electrical power may be various kinds of signal lines or various kinds of power lines. The wire-like transmission member 22 transmitting the electrical power may be used as an antenna or coil, for example, transmitting or receiving a signal or electrical power to or from a space.

The wire-like transmission member 22 includes a transmission wire body that transmits electrical power, light, or the like, and a covering that covers the transmission wire body. When the wire-like transmission member 22 is a general wire, the transmission wire body is a core wire, and the covering is an insulation covering. In the example illustrated in FIG. 2, a plurality of wire-like transmission members 22 having the same diameter and structure are disposed on one base material 30. However, it is only necessary that the diameter, structure, or the like of the plurality of wire-like transmission members 22 be set as appropriate, and the wire-like transmission members 22 having different diameters, structures, or the like may be disposed on the same base material 30.

The wire-like transmission member 22 may be a single wire-like material, or may be a composite of a plurality of wire-like materials (twist wire, a cable in which a plurality of wire-like materials are collected and then covered by a sheath, or the like). At an end portion of the wire-like transmission member 22, a terminal a connector, or the like is provided as appropriate, according to a mode of connecting with a member to be connected with the wire-like transmission member 22.

The base material 30 includes a body part 32 on which the wire-like transmission members 22 are disposed, and an extension piece 34 that extends front the body part 32. On the extension piece 34, the wire-like transmission members 22 are not disposed. In the wiring member 20, the extension piece 34 is wound around once or more on the outer side of the body part 32.

Although the material constituting the base material 30 is not particularly limited, the base material 30 is, for example, made of a material containing resin such as polyvinyl chloride (PVC), polyethylene terephthatete (PET), and polypropylene (PP). The base material 30 may be, for example, a fiber material including fibers, such as nonwoven fabrics, a cloth, and knitted fabrics, or may be a non-fiber material. The non-fiber material may include a solid member whose inside is uniformly filled, a foamed material that is made of resin being foamed, or the like. The base material 30 may include a material such as metal.

The base material 30 may be a single layer, or may have a plurality of layers being stacked. When a plurality of layers are stacked, for example, it is considered that a resin layer and another resin layer are stacked. Alternatively, for example, it is considered that a resin layer and a metal layer are stacked. Further, the base material 30 may be a material in which a non-fiber material layer and another non-fiber material layer are placed on one another, may be a material in which a non-fiber material layer and a fiber material layer are placed on one another, or may be a material in which a fiber material layer and another fiber material layer are placed on one another.

The base material 30 holds the wire-like transmission members 22 in a two-dimensionally positioned state in the flat wiring member 20B. In the following, if the base material 30 in a bent state in the wring member 20 and the base material 30 in a spread state before being bent in the flat wiring member 20B need to be distinguished from each other, the base material 30 in a spread stale before being bent in the Hat wiring member 20B is referred to as a base material 30B.

The wire-like transmission members 22 are disposed on one main surface of the base material 30B. The base material 30B holds the plurality of wire-like transmission members 22 in an arrayed state. The base material 30B is a bendable member. In the following, in the base material 30B, a main surface to which the wire-like transmission members 22 is fixed is referred to as a main surface 31a, and a main surface on the opposite side of the main surface 31a is referred to as a main surface 31b.

The wire-like transmission members 22 are fixed to the base material 30B in a state of being disposed along a predetermined route on the main surface 31a of the base material 30B. The base material 30B is formed into a band-like shape that extends along the route of the wire-like transmission members 22. It is only necessary that the route of the wire-like transmission members 22 on the base material 30B be set as appropriate, and in the present example, the wire-like transmission members 22 have a part that is linearly disposed on the base material 30B. Mainly, the base material 30B is bent so as to surround the wire-like transmission members 22 in the part where the wire-like transmission members 22 are linearly disposed.

The wire-like transmission members 22 may include a part being bent and disposed on the base material 30B. In this case, the base material 30B may also be formed to be bent along the mam surface 31a in accordance with the bending of the wire-like transmission members 22. The plurality of wire-like transmission members 22 may be disposed in different routes, such as in a manner of branching or crossing on the base material 30B. In this case, the base material 30B may also be formed so as to branch or cross. With the base material 30B being formed into a shape along the route of the plurality of wire-like transmission members 22, interference between the base material 30B and other components can be reduced, and weight can be reduced, for example.

The wire-like transmission members 22 and the base material 30B are fixed, and the fixed state is maintained even after the base material 30B is bent to be the base material 30. As the fixing mode, contact area fixation may be used, non-contact area fixation may be used, or both of them may be used at the same time. Here, the contact area fixation is a mode in which the wire-like transmission members 22 and the base material 30B are fixed to each other with their contact part coming in contact with each other. Further, the non-contact area fixation is a fixing mode different from the contact area fixation. For example, the non-contact area fixation is a mode to maintain the wire-like transmission members 22 and the base material 30B in a state of being fixed to each other. This mode is obtained as follows, for example: a thread, another base material, an adhesive tape, or the like presses the wire-like transmission members 22 down toward the base material 30B, or a thread, another base material, an adhesive tape, or the like surrounds the wire-like transmission menders 22 and the base material 30B, for example, so as to interpose the wire-like transmission members 22 and the base material 30B. The following description will be given based on the assumption that the wire-like transmission members 22 and the base material 30B are in a state of the contact area fixation. Each description related to the contact area fixation can also be applied to the non-contact area fixation, unless the application is impossible.

As a mode of the contact area fixation, indirect fixation may be used, direct fixation may be used, or both of them may be used at the same time in different regions. Here, the indirect fixation is a mode in which the wire-like transmission members 22 and the base material 30B are fixed to each other by being indirectly coming in contact via an intermediation member 60 being provided therebetween, such as an adhesive agent, a pressure sensitive adhesive, a double-sided adhesive tape, and a hook-and-loop fastener. Further, the direct fixation is a mode in which the wire-like transmission members 22 and the base material 30B are fixed to each other by being directly coming in contact without the use of a material being separately provided, such as an adhesive agent. In the direct fixation, for example, it is considered that the wire-like transmission members 22 and the base material 30B are fixed by coining in contact with resin included in at least one of those being melted. The following description will be given based on the assumption that the wire-like transmission members 22 and the base material 30B are in a state of the direct fixation. Each description related to the direct fixation can also be applied to the indirect fixation, unless the application is impossible.

In forming the state of such a direct fixation, the resin is considered to be melted by heat or a solvent, for example. That is to say, the state of the direct fixation may be the state of the direct fixation by the heat or the state of the direct fixation by the solvent. The direct fixation by the heat is preferable.

At this time, a means of forming the state of the direct fixation is not particularly limited, but various means including a known means such as welding, fusion, and melting joint can be used. For example, when the state of the direct fixation by the heat is formed by welding, various welding means such as ultrasonic welding, heating-pressurizing welding, hot air welding, and high frequency welding can be adopted. When the state of the direct fixation is formed by these means, the wire-like transmission members 22 and the base material 30B are in the state of the direct fixation by these means. Specifically, when the state of the direct fixation is termed by the ultrasonic welding, for example, the wire-like transmission members 22 and the base material 30B are in the state of the direct fixation by the ultrasonic welding. A portion where the state of the direct fixation by the heat is formed by the welding (a fixing portion between the wire-like transmission members 22 and the base material 30B) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the direct fixation, only the resin included in the covering of the wire-like transmission member 22 may be melted, or only the resin included in the base material 30B may be melted. The resin which has been melted in these cases is stuck on an outer surface of the resin on the other side, and a relatively clear interface may be formed in some cases. In the case of the direct fixation, both the resin included in the covering of the wire-like transmission member 22 and the resin included in the base material 30B may be melted. In this case, there may be a case where both the resins are mixed and a clear interface is not formed. In particular, when the covering of the wire-like transmission members 22 and the base material 30B include compatible resin such as the same resin material, there may be a case where both the resins are mixed and a clear interface is not be formed.

As the base material 30B that is directly fixed to the wire-like transmission members 22, a material obtained by stacking a first sheet-like member and a second sheet-like member may be used. The first sheet-like member is suitable for the direct fixation with the wire-like transmission members 22 than the second sheet-like member. For example, the first sheet-like member is a material that is formed into a solid sheet-like shape by an isologous material of the covering of the wire-like transmission members 22. The first sheet-like member appears on the main surface 31a of the base material 30B. The wire-like transmission members 22 are directly fixed to the first sheet-like member. The second sheet-like member is a member having protection performance higher than that of the first sheet-like member. For example, the second sheet-like member is non woven fabrics. The second sheet-like member appears on the main surface 31b of the base material 30B. The second sheet-like member appears on the outer surface of the wiring member 20. Although in the base material 30 according to the present example, a layer of a metal sheet-like member is not stacked, a layer of a metal sheet-like member may be stacked.

In the wiring member 20, the cross-section is in a spirally wound state. "The cross-section is in a spirally wound state" is, as illustrated in FIG. 3, a state in which winding is performed so that a portion to be newly wound from one edge portion in the base material 30B being a winding start portion toward another edge portion being a winding end portion overlaps the outer side of a portion that has already been wound. In the spirally wound state, the winding start portion is located on the inner circumferential side, and the winding end portion is located on the outer circumferential side. When the extension piece 34 is provided on the base material 30, as illustrated in FIG. 3, wound may be performed so that the main surface 31a of the base material 30 is located either on the inside or outside with respect to the main surface 31b. When the extension piece 34 is not provided, it is satisfactory that the main surface 31a is wound so as to be located on the inside with respect to the main surface 31b.

Figure 4:
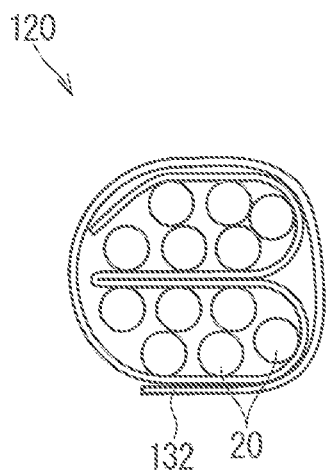
FIG. 4 is a front view illustrating a modification of the wiring member.

If the base material 30 is bent so as to surround the wire-like transmission members 22, the cross-section need not necessarily be in the spirally wound state in the wiring member 20. For example, as illustrated in FIG. 4, the wiring member 20 may be folded so that the wire-like transmission members 22 are located on the inside with respect to the base material 30.

The wire-like transmission member 22 that come in contact with both of the base material 30 on the inner circumferential side and the base material 30 on the outer circumferential side may be present in the in the wiring member 20. In the example illustrated in FIG. 2, the wire-like transmission member 22 on the outer circumferential side in the spiral wiring member 20 (the wire-like transmission member 22 on the outside of the part wound around once front the center portion) comes in contact with both of the base material 30 on the inner circumferential side and the base material 30 on the outer circumferential side with respect to the wire-like transmission member 22. The wire-like transmission member 22 that comes in contact with both of the base materials 30 in inner and outer directions with respect to the wire-like transmission member 22 is joined to only one of both of the base materials 30 in the inner and outer directions. This is because the flat wiring member 20B is wound to be the wiring member 20. In the example illustrated in FIG. 2, the main surface 31a is wound so as to be located on the inside with respect to the main surface 31b, and thus the wire-like transmission member 22 coming in contact with both of the base materials 30 in the inner and outer directions is joined to only the base material 30 on the outer circumferential side out of both of the base materials 30 in the inner and outer directions.

There may be a portion in which the wire-like transmission members 22 not adjacent in the wiring member 20 directly face each other without interposing the base material 30 therebetween. In the example illustrated in FIG. 2, there is a portion in which the wire-like transmission members 22 directly face each other without interposing the base material 30 therebetween at the center portion of the spiral wiring member 20. Because the flat wiring member 20B is wound to be the wiring member 20, there may be a portion in which the wire-like transmission members 22 directly face each other without interposing the base material 30 therebetween.

The base material 30 may be formed so that the thickness is entirely uniform, or may be formed so that parts thereof have a portion having different thicknesses. When the base material 30 is formed so that parts thereof have a portion having different thicknesses, it is considered that the thickness of a part having a high probability of coming in contact with a surrounding component in a state in which the wiring member 20 is disposed in a vehicle or the like is set larger than the thickness of a part having a low probability of coming in contact with a surrounding component. In this manner, when the base material 30 is formed so that parts thereof have a portion having different thicknesses, for example, the parts having different thicknesses may be present separately in the longitudinal direction of the wire-like transmission members 22, or the parts having different thicknesses may be present along the direction in which the wire-like transmission members 22 are arrayed.

The fixing member 40 includes an attachment part 42 that is attached to the wiring member 20, and a fixing part 50 that is connected to the attachment part 42 and that is fixed to a fixing target 80 of the wiring member 20. The attachment part 42 is attached so as to be located on the outside of the base material 30. In a state in which the attachment part 42 is attached to the wiring member 20, the base material 30 is maintained in a bent state. With the flat wiring member 20B being wound to be the wiring member 20 and the attachment part 42 being removed from the wiring member 20. the base material 30 spreads and can be restored from the wiring member 20 to the flat wiring member 20B.

Figure 5:
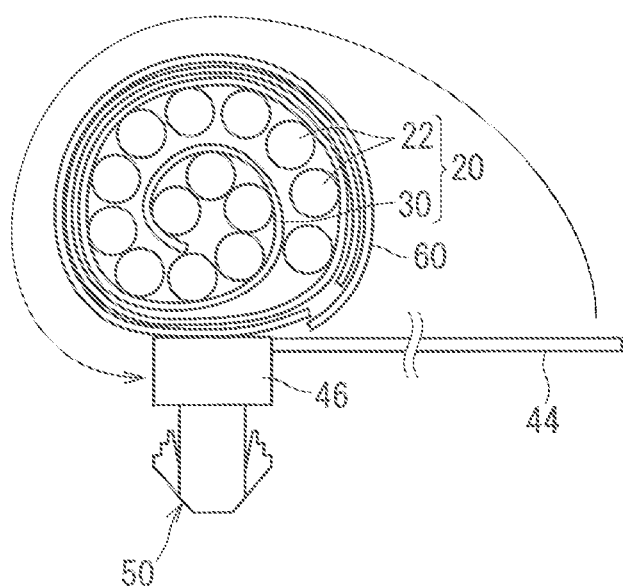
FIG. 5 is a front view illustrating a state in which the fixing member is attached to the wiring member.

The fixing member 40 according to the present example is a molded item obtained by integrally molding the attachment part 42 and the fixing part 50. The attachment part 42 includes an annular part 44 and an annular shape maintaining part 46. The annular part 44 can change its state between an annular state as illustrated in FIG. 2 and a non-annular state as illustrated in FIG. 5. The annular part 44 surrounds the wiring member 20 in the annular state. The annular shape maintaining part 46 is provided at one end portion of the annular part 44. The annular shape maintaining part 46 stops another end portion of the annular part 44 to maintain the annular part 44 in the annular state.

Specifically, in the present example, a band clamp 40 is used as the fixing member 40. In other words, the annular part 44 is a band part 44, and the annular shape maintaining part 46 is a band fixing part 46. The band part 44 is formed into a narrow band-like shape so as to be entirely bent and deformed. The band fixing part 46 includes, for example, a body part 47 in which a band insertion hole 47h that allows the band part 44 to be inserted therethrough is formed, and an engaging protrusion (not shown) that is formed to protrude from an inner circumferential surface of the band insertion hole 47h toward a space in the band insertion hole 47h. In the band part 44, a plurality of engaged parts (not shown) with which the engaging protrusion can be selectively engaged are formed. In a state in which the band part 44 is inserted in to the band insertion hole 47h, when the engaging protrusion is engaged with the engaged part, the band part 44 is slopped at the band fixing part 46.

In the example illustrated in FIG. 2, in a state in which an intermediate portion of the band part 44 is wound around an outer circumferential portion of the wiring member 20, when a tip end portion of the band part 44 is fixed to the band fixing part 46, the attachment part 42 is in a state of being attached to the wiring member 20. It is satisfactory that the attachment part 42 fastens the wiring member 20. In this case, in the part where the attachment part 42 is attached, it is considered that the nonwoven fabrics in the base material 30 are partially compressed as compared to the nonwoven fabrics in the base material 30 at a part where the attachment part 42 is not attached. Regarding the nonwoven fabrics in the base material 30 at the where the attachment part 42 is attached, the compressed state is restored when the attachment part 42 is removed. Further, the nonwoven fabrics in the base material 30 at the where the attachment part 42 is attached maintain a soft state. It is satisfactory that the nonwoven fabrics in the base material 30 at the where the attachment part 42 is attached maintain a state that is as soft as or that is slightly less soft than the nonwoven fabrics in the base material 30 at the where the attachment part 42 is not attached.

The fixing part 50 in the band clamp 40 is formed so as to be capable of being engaged with a through hole 82 that is formed in a plate-like member 80 such as a panel. The fixing part 50 includes a pillar part 52 that is formed to protrude from the band fixing part 46, and a pair of engagement pieces 54 that is formed to protrude from a tip end portion of the pillar part 52 toward a lateral side and a base end side of the pillar part 52. On the base end side of the pair of engagement pieces 54, the pair of engagement pieces 54 is formed so that its interval gradually becomes wider toward its tip end side. Further, when the fixing part 50 is inserted into the through hole 82 and comes in contact with a circumferential edge portion of the through hole 82, the pair of engagement pieces 54 can be elastically deformed so that its interval is reduced by receiving a force from the circumferential edge portion of the through hole 82. After the tip end portion passes through the through hole 82, the pair of engagement pieces 54 is elastically restored, and is engaged with the circumferential edge portion of the through hole 82. With this, the fixing part 50 is in a state of being fixed to the fixing target 80.

The intermediation member 60 is fixed to an outer circumferential portion of the base material 30. The intermediation member 60 is interposed between the annular part 44 and the base material 30. A coefficient of friction in the outer surface of the intermediation member 60 with respect to the annular part 44 is higher than a coefficient of friction in the outer surface of the base material 30 with respect to the annular part 44. The material of the intermediation member 60 is not particularly limited on the condition that the coefficient of friction in the outer surface of the intermediation member 60 with respect to the annular part 44 is higher than the coefficient of friction in the outer surface of the base material 30 with respect to the annular part 44. For example, it can be assumed that, as the intermediation member 60, an adhesive tape is wound and fixed to the outer surface of the base material 30.

Manufacturing Method

A manufacturing method of the wiring member with a fixing member 10 will be described. The manufacturing method of the wiring member with a fixing member 10 includes the following step (a), step (b), and step (c).

Step (a) is a step of preparing tie wiring member (flat wiring member 20B) formed flat, the wiring member including the plurality of wire-like transmission members 22, and the base material 30 in which the plurality of wire-like transmission members 22 are fixed in an arrayed state. Here, as the flat wiring member 20B, a member that is formed flat with the plurality of wire-like transmission members 22 being directly fixed on the main surface 31a of the base material 30B in an arrayed state is prepared.

Step (b) is a step of bending the base material 30B so that the base material 30 surrounds the wire-like transmission members 22. Here, both of the body part 32 and the extension piece 34 of the base material 30B are bent. Here, a portion to be newly wound from one edge portion along an aligning direction of the wire-like transmission members 22 out of the flat wiring member 20B toward another edge portion is located on the outer circumferential side of a portion that has already been wound. With this, in the wiring member 20 after the base material 30 is bent, the cross-section is in a spirally wound state. When arrangement of the wire-like transmission members 22 is focused, the arrangement is changed from a state of side-by-side arrangement in one row in the flat wiring member 20B to spiral arrangement in the wiring member 20. The wiring member 20, which is obtained by winding the flat wiring member 20B to which the wire-like transmission members 22 are fixed to the base material 30B in advance, is used, find thus the wire-like transmission members 22 need not be pressed, and winding is easily performed. Further, in a state of being the wiring member 20, arrangement of the wire-like transmission members 22 is less liable to be disturbed from predetermined arrangement.

Step (c) is a step of attaching the attachment part 42 in the fixing member 40 to the wiring member 20 so as to be located on outside of the base material 30 so as to maintain the base material 30 in a bent state, the fixing member 40 including the attachment part 42, and the fixing part 50 being connected to the attachment part 42 and being, fixed to the fixing target 80 of the wiring member 20. Here, the fixing member 40 is the band clamp 40 including band part 44 and the band fixing part 46 as the attachment part 42. In this case, after the band part 44 is externally wound around the base material 30, the tip end portion of the band part 44 is caused to pass through the band insertion hole 47h of the band fixing part 46, and is fixed.

Note that, when the wiring member 20 including the intermediation member 60 is manufactured, it is satisfactory that a step of providing the intermediation member be provided prior to step (c). For example, when the intermediation member 60 is an adhesive tape, after step (b), an adhesive tape is wound around at the outer circumferential portion at the where the fixing member 40 is provided in the wiring member 20. In this case, it is satisfactory that winding is performed so that the adhesive tape as the intermediation member 60 stops the winding end portion at the part to overlap the inner circumferential side of the winding end portion. With this, the intermediation member 60 functions aa a provisional stopping part that reduces spreading of the wiring member 20 before the fixing member 40 is provided.

According to the wiring member with a fixing member 10, in a state in which the attachment part 42 is attached to the wiring member 20 in the wiring member 20, the base material 30 is maintained in a bent state so as to surround live wire-like transmission members 22. Thus, in the wiring member 20, the entire circumference of the wire-like transmission members 22 can be protected by the base material 30. In the wiring member 20, the cross-section is in a spirally wound state, and thus the base material 30 can easily form the bent state so as to surround the wire-like transmission members 22.

The fixing member 40 may be a molded item obtained by integrally molding the attachment part 42 and the fixing part 50. The attachment part 42 may include the annular part 44 being capable of changing a state between an annular state and a non-annular state and surrounding the wiring member 20 in the annular state, and the annular shape maintaining part 46 being provided at one end portion of the annular part 44 and stopping another end portion of the annular part 44 to maintain the annular part 44 in the annular state. In this case, as the fixing member 40, the general-purpose band clamp 40 can be used as in the present example.

The base material 30 includes the body part 32 to which the wire-like transmission members 22 are fixed, and the extension piece 34 extending from the body part 32. In the wiring member 20, the extension piece 34 is wound around once or more on the outer side of the body part 32. Thus, the entire outer side of the body part 32 can be covered by the extension piece 34. In wiring member 20, the extension piece 34 need not necessarily wound around once or more on the outer side of the body part 32. A region in which the extension piece 34 is wound around on five outer side of the body part 32 in the wiring member 20 may be a half or more or less than the whole of the outer side, or may be less than a half thereof.

An intermediation member 60 being fixed at an outer circumferential portion of the base material 30 and being interposed between the annular part 44 and the base material 30 is further included. A coefficient of friction in an outer surface of the intermediation member 60 with respect to the annular part 44 is higher than a coefficient of friction in an outer surface of the base material 30 with respect to the annular part 44. Thus, the annular part 44 can reduce rotation of the wiring member 20 in the circumferential direction. The intermediation member 60 need not necessarily be provided. When the coefficient of friction between the outer surface of the base material 30 and the inner surface of the annular part 44 is high, rotation between the base material 30 and the annular part 44 can be reduced even without the provision of the intermediation member 60. For example, when the outer surface of the base material 30 is a member that is not significantly slippery, or when a non-slip protrusion is formed on the inner surface of the annular part 44, the coefficient of friction between the outer surface of the base material 30 and the inner surface of the annular part 44 can be increased.

Second Embodiment

Figure 6:
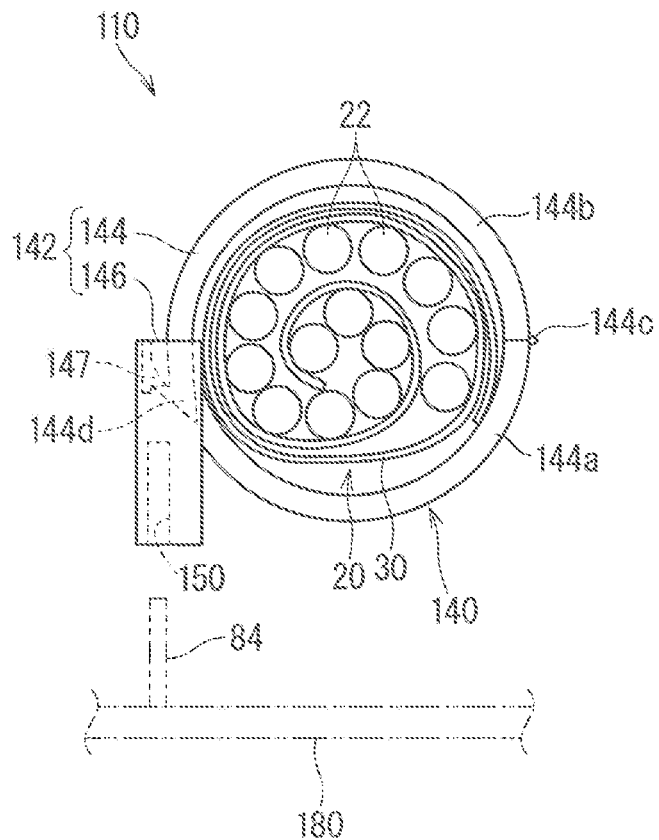
FIG. 6 is a front view illustrating a wiring member with a fixing member according to the second embodiment.
Figure 7:
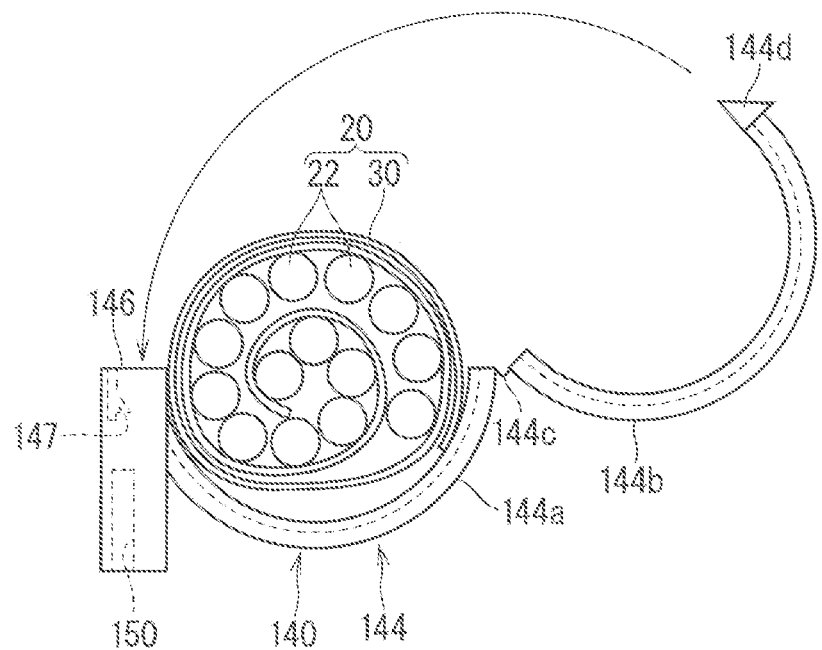
FIG. 7 is an explanatory diagram illustrating a state in which the fixing member is open.

A wiring member with a fixing member according to the second embodiment will be described. FIG. 6 is a front view illustrating a wiring member with a fixing member 110 according to the second embodiment. FIG. 7 is an explanatory diagram illustrating a state in which a fixing member 140 is open. Note that constituent elements similar to those described above in the description of the present embodiment are denoted by the same reference signs, and description thereof will be omitted. The same applies to description of description of other embodiments described below.

Regarding the wiring member with a fixing member 110 according to the present example, the shape of the fixing member 140 is different from the shape of the fixing member 40 according to the first embodiment. Specifically, in the present example as well, the fixing member 140 is a molded item obtained by integrally molding an attachment part 142 and a fixing part 150, and the attachment pail 142 includes an annular part 144 that can change its state between an annular state and a non-annular state and that surrounds the wiring member 20 in the annular state, and an annular shape maintaining part 146 that is provided at one end portion of the annular part 144, and that stops another end portion of the annular part 144 to maintain the annular part 144 in the annular state. The present example is an example in which a hinge pivotable damp 140 (also referred to as a corrugated clamp) is used as the fixing member 140.

In the clamp 140, the annular part 144 includes a plurality of (here, two) partial annular parts 144a and 144b, and a hinge part 144c. The partial annular parts 144a and 144b have a shape that is divided in the circumferential direction. The plurality of partial annular parts 144a and 144b form an annular shape when being combined together. Each of the partial annular parts 144a and 144b has such rigidity as to be capable of maintaining a partially annular state. Ribs are provided on the inner surfaces of the partial annular parts 144a and 144b. The ribs continue in the circumferential direction. A plurality of ribs are provided so as to be away from each other in the axial direction. The ribs can dig into the outer surface of the wiring member 20. The hinge part 144c relatively pivotably couples the partial annular parts 144a and 144b being adjacent to each other. For example, the hinge part 144c is a part that is formed to be thin.

The annular shape maintaining part 146 is provided at circumferential end portions of the partial annular parts 144a and 144b. In the annular shape maintaining part 146, an engaging protrusion 147 is formed. The engaging protrusion 147 can be engaged with an engaged part 144d that is formed at the circumferential end portion of the partial annular part 144b.

The fixing part 150 is formed so as to allow insertion and engagement of a plate-like fixing piece 84 that is presided at a fixing target 180. The fixing part 150 is integral with the annular shape maintaining part 146. Specifically, a box part is provided at the circumferential end portion of the partial annular part 144b, and the engaging protrusion 147 is formed at one end of the box part and the fixing part 150 is provided at another end of the box part.

Third Embodiment

Figure 8:
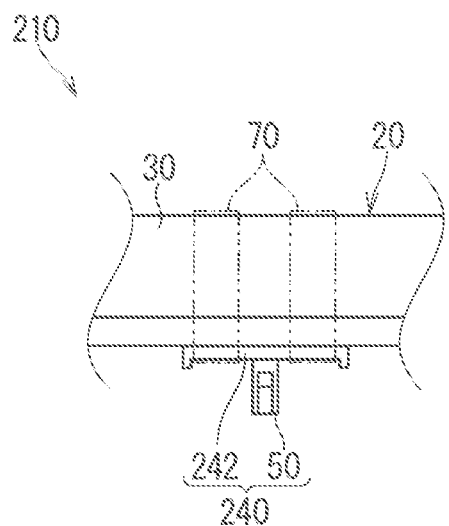
FIG. 8 is a side view illustrating a wiring member with a fixing member according to the third embodiment.
Figure 9:
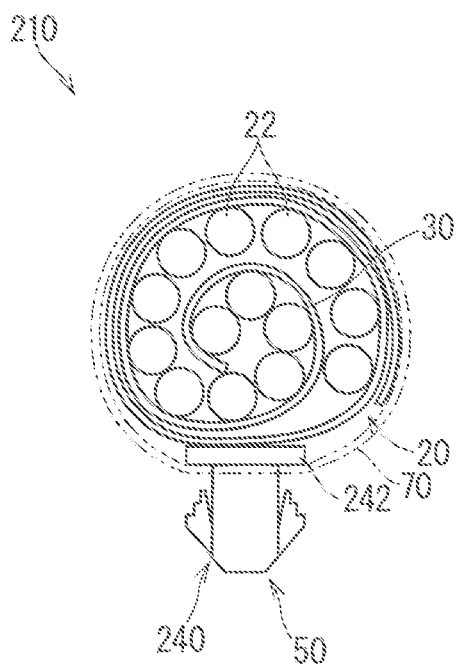
FIG. 9 is a from view illustrating a wiring member with a fixing member according to the third embodiment.

A wiring member with a fixing member according to the third embodiment will be described. FIG. 8 is a side view illustrating a wiring member with a fixing member 210 according to the third embodiment. FIG. 9 is a front view illustrating the wiring member with a fixing member 210 according to the third embodiment.

Regarding the wiring member with a fixing member 210 according to the present example, the shape of a fixing member 240 Is different from the shape of the fixing members 40 and 140 according to the first and second embodiments. Specifically, in the present example as well, the fixing member 240 is a molded item obtained by integrally molding an attachment part 242 and the fixing part 50. The attachment part 242 according to the present example is a plate-like part 242 that is formed in to a long plate-like shape. The attachment is performed in a state in which the longitudinal direction of the plate-like part 242 extends along the longitudinal direction of the wiring member 20. One main surface of the plate-like part 242 faces the wiring member 20. The fixing part 50 is provided to protrude from another main surface of the plate-like part 242. Although the fixing part 50 is provided at an intermediate portion of the plate-like part 242 in the longitudinal direction, the fixing part 50 may be provided at an end portion of the plate-like part 242 in the longitudinal direction.

The wiring member with a fixing member 210 further includes a bundling member 70 that bundles the attachment part 242 and the wiring member 20. As the bundling member 70, for example, an adhesive tape 70 can be used. The adhesive tape 70 is wound around the plate-like part 242 and the wiring member 20 at positions in the plate-like part 242 except for the part where the fixing part 50 is provided.

The fixing member 240 is a molded item obtained by integrally molding the attachment part 242 and the fixing part 50. The attachment part 242 is formed into a plate-like shape extending in the longitudinal direction of the wiring member 20. The wiring member 20 with the fixing member 240 further includes the bundling member 70 that bundles the attachment part 242 and the wiring member 20. Thus, as the fixing member 240. the general-purpose taping-type clamp 240 or the like can be used as in the present example.

Note that each configuration described in each embodiment and each modification described above can be combined with each other as appropriate unless there is no inconsistency.

EXPLANATION OF REFERENCE SIGNS

10 Wiring member with fixing member
20 Wiring member
20B Flat wiring member
22 Wire-like transmission member
30 Base material
31a, 31b Main surface
32 Body part
34 Extension piece
40, 140, 240 Fixing member
42, 142, 242 Attachment part
44, 144 Annular part
144a, 144b Partial annular part
144c Hinge part
144d Engaged part
46, 146 Annular shape maintaining part
47 Body part
47h Band insertion hole 147 Engaging protrusion
50, 150 Fixing part
52 Pillar part
54 Engagement piece
60 Intermediation member
70 Bundling member
80, 180 Fixing target
82 Through hole
84 Fixing piece

The invention claimed is:

1. A wiring member with a fixing member, comprising:
a wiring member; and
a fixing member, wherein
the wiring member includes a plurality of wire-like transmission members and a base material,
the plurality of wire-like transmission members are fixed to the base material in an arrayed state,
the base material is bent so as to surround the plurality of wire-like transmission members,
the fixing member includes an attachment part and a fixing part,
the attachment part is attached to the wiring member so as to be located on outside of the base material,
the fixing part is a part being connected to the attachment part and being fixed to a fixing target of the wiring member,
in a state in which the attachment part is attached to the wiring member, the base material is maintained in a bent state,
the fixing member is a molded item obtained by integrally molding the attachment part and the fixing part,
the attachment part includes an annular part being capable of changing a state between an annular state and a non-annular state and surrounding the wiring member in the annular state, and an annular shape maintaining part being provided at one end portion of the annular part and stopping another end portion of the annular part to maintain the annular part in the annular state,
the wiring member further includes an intermediation member being fixed at an outer circumferential portion of the base material and being interposed between the annular part and the base material, and
a coefficient of friction in an outer surface of the intermediation member with respect to the annular part is higher than a coefficient of friction in an outer surface of the base material with respect to the annular part.

2. The wiring member with a fixing member according to claim 1, wherein
in the wiring member, cross-section is in a spirally wound state.

3. The wiring member with a fixing member according to claim 1, wherein
the fixing member is a molded item obtained by integrally molding the attachment part and the fixing part,
the attachment part is formed into a plate-like shape extending in a longitudinal direction of the wiring member, and
the wiring member with the fixing member further comprises a bundling member configured to bundle the attachment part and the wiring member.

4. The wiring member with a fixing member according to claim 1, wherein the base material includes a body part in which the wire-like transmission member is disposed, and an extension piece in which the wire-like transmission member is not disposed, the extension piece extending from the body part, and in the wiring member, the extension piece is wound around once or more on an outer side of the body part.

5. A manufacturing method of a wiring member with a fixing member, comprising:
preparing a wiring member formed flat, the wiring member including a plurality of wire-like transmission members, and a base material in which the plurality of wire-like transmission members are fixed in an arrayed state;
bending the base material so that the base material surrounds the plurality of wire-like transmission members; and
attaching an attachment part in a fixing member to the wiring member so as to be located on outside of the base material so as to maintain the base material in a bent state, the fixing member including the attachment part, and a fixing part being connected to the attachment part and being fixed to a fixing target of the wiring member, wherein the fixing member is a molded item obtained by integrally molding the attachment part and the fixing part, the attachment part includes an annular part being capable of changing a state between an annular state and a non-annular state and surrounding the wiring member in the annular state, and an annular shape maintaining part being provided at one end portion of the annular part and stopping another end portion of the annular part to maintain the annular part in the annular state, the wiring member further includes an intermediation member being fixed at an outer circumferential portion of the base material and being interposed between the annular part and the base material, and a coefficient of friction in an outer surface of the intermediation member with respect to the annular part is higher than a coefficient of friction in an outer surface of the base material with respect to the annular part.

* * * * *